United States Patent [19]

Henmi et al.

[11] Patent Number: 4,592,652
[45] Date of Patent: Jun. 3, 1986

[54] SHEET MATERIAL CONTACTING DEVICE

[75] Inventors: Kojiro Henmi; Eiji Miyasaka, both of Hikone, Japan

[73] Assignee: Dainippon Screen Manufacturing Co., Ltd., Kyoto, Japan

[21] Appl. No.: 668,349

[22] Filed: Nov. 5, 1984

[30] Foreign Application Priority Data

Jan. 31, 1984 [JP] Japan .................................. 59-16758

[51] Int. Cl.⁴ ............................................ G03B 27/62
[52] U.S. Cl. ...................................................... 355/76
[58] Field of Search ...................... 355/67, 72, 75, 76, 355/93, 128–131, 118

[56] References Cited

U.S. PATENT DOCUMENTS 2,774,289  12/1956  Collins .................................. 355/75
3,711,197  1/1973   Paull ..................................... 355/128

Primary Examiner—L. T. Hix
Assistant Examiner—Brian W. Brown
Attorney, Agent, or Firm—Millen & White

[57] ABSTRACT

A sheet material contacting device comprising a flexible sheet-like pressing member having a sufficient weight to force a sheet material against a planar transparent plate, a pair of rigid support members fixedly holding opposed edges of said pressing member, and means for vertically moving said pressing member relative to said transparent plate.

4 Claims, 8 Drawing Figures

SHEET MATERIAL CONTACTING DEVICE

BACKGROUND OF THE INVENTION

The present invention relates to optical instruments such as process cameras, electrostatic copying machines. More particularly, it relates, in an optical instrument constructed to support a sheet material such as a sensitive material or an original film on a planar transparent plate, to a device for pressing and contacting said sheet material with said transparent plate.

Typical optical instruments adapted to support a sheet material on a transparent plate having a horizontal plane includes a slit exposure type camera as shown in FIG. 7. Such camera, taken as an example, will be described below.

The optical system thereof is so arranged that light from a film 2 on a horizontal original mount 1 equipped with a vacuum suction mechanism travels via a movable optical system consisting of a triangle mirror 3, a lens 4, and a mirror 5 and then through a transparent plate 6 to reach a photosensitive material 7. When the original film 2 is manually set on the original mount 1, a sensitive material 7, with its sensitive surface down, is nipped by rollers 8 and carried in onto a predetermined position on the transparent plate 6 by suction transfer means 9, whereupon a contact device 20 shown in FIG. 8 (to be later described in more detail) is lowered to press the sensitive material 7 from behind to contact the latter with the transparent plate 6. In this condition, scanning exposure is effected by moving said optical system, whereupon the sensitive material 7 is carried out by the suction transfer means 9 and carry-out rollers 11.

In this connection, in such camera, if there is a clearance between the sensitive material 7 and the transparent plate 6 during exposure, this results in incorrect focussing and other inconveniences. For this reason, use is made of the contact device 20 adapted to press the sensitive material 7 from behind to contact it with the transparent plate 6. FIG. 8 is a perspective view of a conventional contact device 20 from below. In this figure, a frame 21 is vertically movable by rotating eccentric cams 24 and 25 mounted on drive shafts 22 and 23, and the frame assumes its upper position when the sensitive material 7 is moving and its lower position during exposure. When the frame 21 is in its lower position, a rubber plate 27 bonded to an L-shaped member 26 fixed to said frame 21 presses the sensitive material 7 from behind to contact it with the transparent plate 6. In addition, said frame 21 is locally formed with openings to allow movement of the suction transfer means 9.

The conventional contact device 20, which is designed to contact the sensitive material 7 by means of a rigid body such as said L-shaped member 26, as described above, has the following inconveniences.

It is difficult to attain planar alignment between the transparent plate 6 and the L-shaped member 26, and its machining takes much time and even if it is machined with high accuracy, it locally fails to contact. Further, since the middle portion of the transparent plate 6 is downwardly deflected under its own weight, there is a difference between the degrees of contact in the middle and peripheral regions. Further, the simultaneous pressing of the entire surface of the sensitive material can result in a small air pool being formed in the middle or in a movement of the sensitive material due to the flow of the air held between the sensitive material 7 and the transparent plate 6 when said air escapes from therebetween, said movement resulting in the sensitive material 7 being contacted with the transparent plate 6 at a position deviated from the predetermined position. A further inconvenience is that a locally curled sensitive material 7 is caused to bend or wrinkle or is moved to contact at a deviated position.

SUMMARY OF THE INVENTION

The present invention has for its object the provision of a sheet material contacting device for use with an optical instrument arranged to place a sheet material such as a sensitive material or an original on a transparent plate having a planar surface, wherein the entire surface of such sheet material can be evenly contacted by simple means not requiring precise machining and it can be contacted with the transparent plate 6 without being deviated from the predetermined position thereon and, moreover, even a curled sheet material can be contacted without bending or wrinkling.

The invention relates to a sheet material contacting device comprising a flexible sheet-like pressing member having a sufficient weight to force a sheet material against a planar transparent plate, a pair of rigid support members fixedly holding opposed edges of said pressing member, and means for vertically moving said pressing member relative to said transparent plate.

DETAILED DESCRIPTION OF PREFERRED EMBODIMENTS

Figure 1:
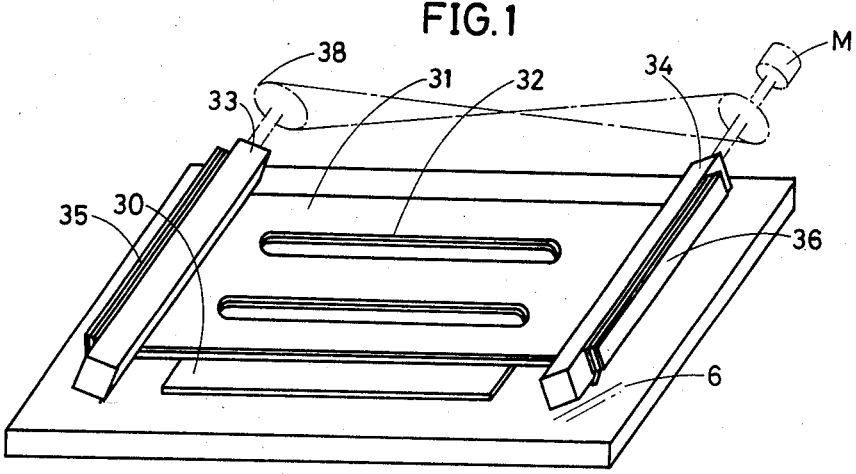
FIG. 1 is a perspective view of a sheet material contacting device constructed in accordance with a first embodiment of the invention.

FIG. 1 is a perspective view of a first embodiment of the invention as seen from above the transparent plate 6. In addition, the suction transfer means 9 is omitted from the illustration.

In the sheet material contacting device according to the first embodiment, a pressing member 31 is in the form of a flexible sheet having a sufficient weight to force a sheet material 30 against the planar transparent plate 6. In this embodiment, it is in the form of a rubber sheet of about 4 mm in thickness having an unstretchable fabric bonded to the lower surface thereof. The thickness of such rubber sheet is not limited to 4 mm, and where a stiff sheet material 30 is to be contacted, it is suitable to use a thicker rubber sheet to increase the weight; thus, it is desirable that the optimum thickness be empirically determined by the characteristics of the sheet material 30 to be contacted. The bonding of a fabric to such rubber sheet stems from a consideration of the fact that the rubber material has not only flexibility but also elasticity, so that if the pressing member 31 is formed of the rubber material alone, it would be stretched if pulled; thus, the purpose is to suppress its stretchability. Further, since the rubber material has stickiness in its surface and its frictional resistance is high, the rubber sheet surface, if directly contacted with the sheet material, would not slide smoothly, and if it contacts the curled portion of the sheet material 30, trouble to the transfer and other inconveniences would result; thus, the fabric is bonded also to improve the slide movement.

Figure 2:
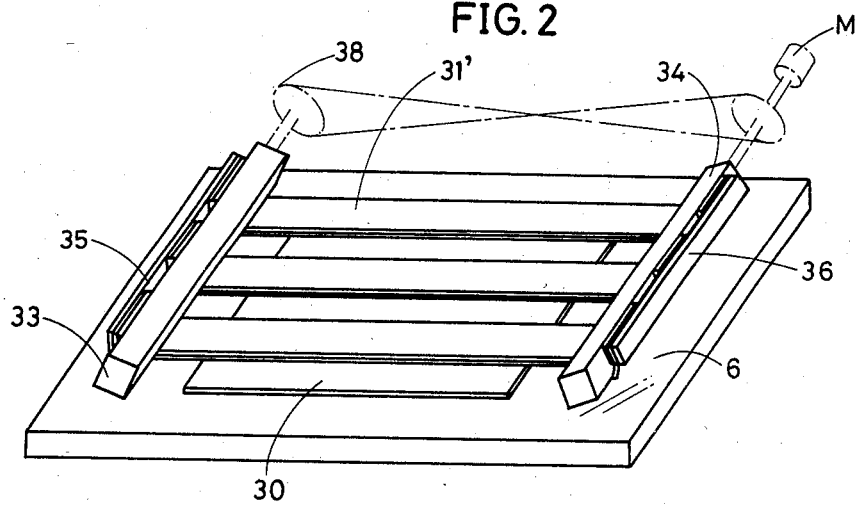
FIG. 2 is a similar view of the device constructed in accordance with a second embodiment of the invention.

In addition, two horizontally elongated openings 32 are formed in this pressing member 31, the purpose being to allow the suction transfer means 9 to act on the sheet material 30. Thus, if the suction transfer means 9 is not used, for example, if the sheet material 30 is in the form of a roll of long strip and is transferred only by the carry-in and carry-out rollers 8 and 11, there is no need to provide such openings 32. Instead of providing the openings 32, for example, as in a second embodiment shown in FIG. 2, a pressing member 31' may be divided into three which are disposed at positions spaced a required distance apart from each other. The size of the pressing member 31' is desirably greater than that of the sheet material 30 to completely cover the entire surface of the sheet material 30. So long as the entire area of the sheet material 30 can be contacted with the transparent plate 6, there would be no trouble even if it is left locally uncovered. However, it is desirable to see that the pressing member 31' covers the curled upright portion of the sheet material 30.

Figure 3:
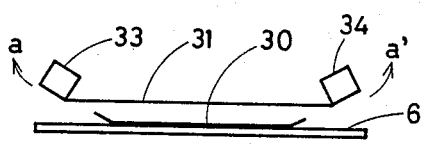
FIG. 3 and FIG. 4 schematically illustrate the operation of the devices of FIG. 1 and FIG. 2.
Figure 4:
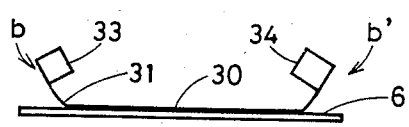

Support members 33 and 34 are a pair of rigid bodies disposed above the transparent plate 6 and fix opposite end edges of the pressing member 31; thus, they act to pull the pressing member at its opposite ends to make it taut over and above the transparent plate 6. In the second embodiment, such support bodies 33 and 34 are iron bars spaced about 140 cm apart form each other and disposed about 4 cm above the transparent plate 6. The pressing member 31 is screwed at its opposite ends to the support members 33 and 34 through seat plates 35 and 36. In the first and second embodiments, the support members 33 and 34 are driven for rotation in mutually opposite directions by a belt transmission mechanism 38 which is in crossed belting relation to a motor M. When the sheet material 30 is to be transferred, the support members are rotated in the directions of arrow a and a' shown in FIG. 3 so as to pull the pressing member 31 at its opposite ends to cause its entire area to be spaced above the transparent plate 6, while when the sheet material 30 is to be contacted with the transparent plate 6, they are rotated in the directions of arrow b and b' shown in FIG. 4 so as to slacken the pressing member 31 and lower the latter gently onto the transparent plate 6, with the weight of the pressing member 31 intimately contacting the sheet material 30 with the transparent plate 6. In addition, the movement of such support members 33 and 35 is not limited to the rotational motion as in the above embodiments, but it may be a translational motion in which they are moved toward and away from each other by using a rack and a pinion, as shown in FIG. 5, which illustrates a third embodiment of the invention.

Figure 6:
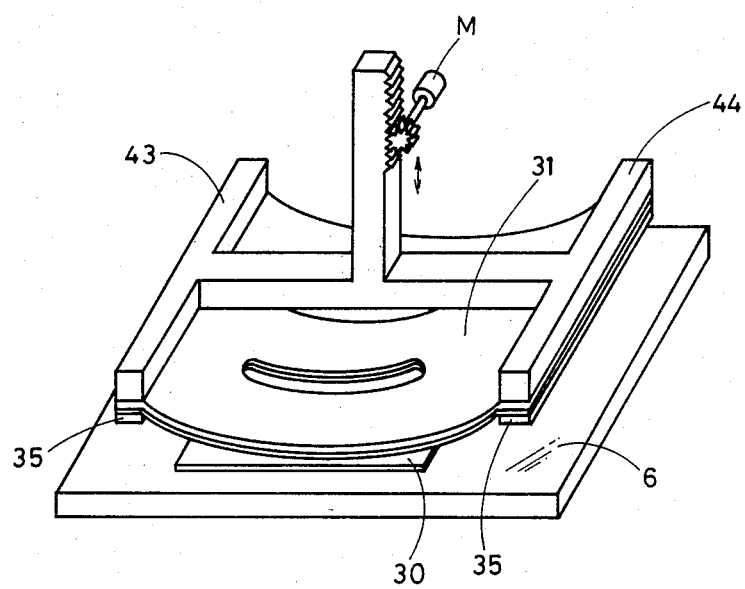
Figure 7:
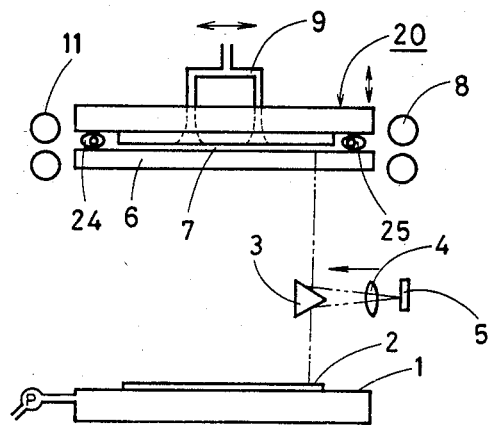
FIG. 7 is schematically illustrate a slit exposure type camera having a known sheet material contacting device of the type used herein.
Figure 8:
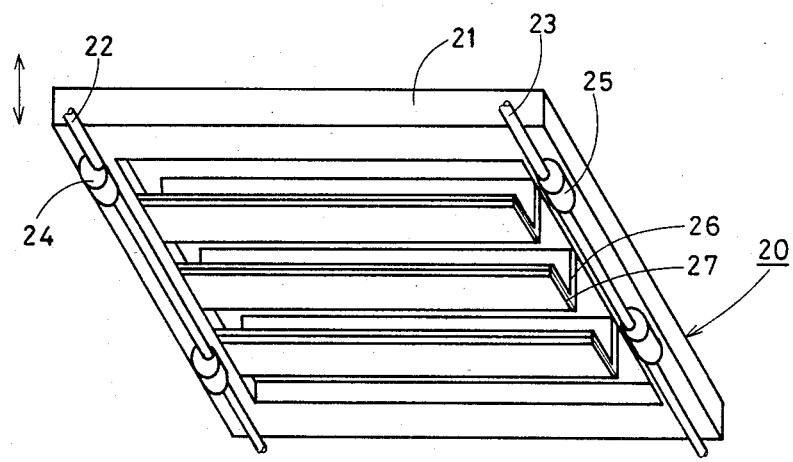
FIG. 8 is a perspective view of the sheet material contacting device used in the camera of FIG. 7.

Further, as shown in FIG. 6, which illustrates a fourth embodiment of the invention, the support members 33 and 34 may be so arranged that they hold the pressing member 31 in sagging condition at all times and are lifted and lowered by a rack and a pinion so as to lift and lower the pressing member 31. The movement of the support bodies 33 and 34 may be effected manually as well as by a drive source such as a motor M.

Figure 5:
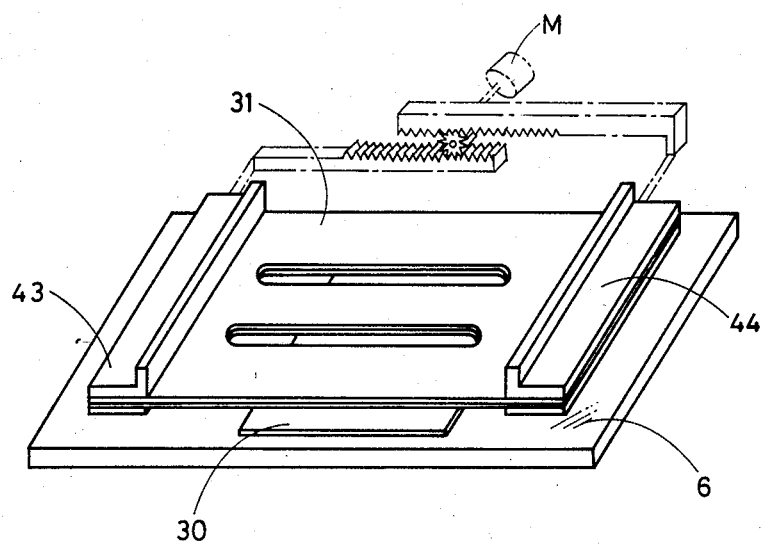
FIG. 5 and FIG. 6 respectively illustrate the devices according to a third and a fourth embodiment of the invention.

As for the shape of the support members 33 and 34, it is not limited to a bar form as shown in FIG. 1, but members 43 and 44 of L-shaped cross section may be used, as shown in FIG. 5; thus, their shape is not specified.

In addition, the sheet material contacting device according to the invention is not limited in application to the slit exposure camera as described above, but it is applicable to any optical instrument that is designed so that the sheet material 30 is placed on the horizontal transparent plate and contacted with the latter. Further, the sheet material 30 is not limited to said sensitive material in the slit exposure camera, but it may be an original film fabric, paper, roll, or the like.

We claim:
1. A sheet material contacting device comprising:
a flexible sheet-like pressing member having a sufficient weight to force a sheet material against a planar transparent plate;
a pair of rigid support members fixedly holding opposed edges of said pressing member the support members being in the form of bars which are rotatable in mutually opposite directions; and
means for vertically moving said pressing member relative to said transparent plate.

2. The device as set forth in claim 1, wherein said pressing member comprises a rubber plate and a fabric bonded to the lower surface of said rubber plate.

3. A sheet material contacting device comprising:
a flexible sheet-like pressing member having a sufficient weight to force a sheet material against a planar transparent plate;
a pair of parallel, rigid support members fixedly holding opposed edges of said pressing member;
means for moving the support members toward and away from one another while maintaining the support members parallel, and
means for vertically moving said pressing member relative to said transparent plate.

4. The device as set forth in claim 3, wherein said pressing member comprises a rubber plate and a fabric bonded to the lower surface of said rubber plate.

* * * * *